(12) United States Patent
Yu et al.

(10) Patent No.: US 12,728,498 B2
(45) Date of Patent: Sep. 8, 2026

(54) SLURRY MONITORING DEVICE, CMP SYSTEM AND METHOD OF IN-LINE MONITORING A SLURRY

(71) Applicant: TAIWAN SEMICONDUCTOR MANUFACTURING COMPANY LTD., Hsinchu (TW)

(72) Inventors: Chwen Yu, Taipei City (TW); Ting-Wen Chen, Hsinchu City (TW); Chi Wen Kuo, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 18/582,659

(22) Filed: Feb. 21, 2024

(65) Prior Publication Data

US 2024/0189961 A1 Jun. 13, 2024

Related U.S. Application Data

(62) Division of application No. 17/460,046, filed on Aug. 27, 2021, now Pat. No. 11,938,586.

(51) Int. Cl.
*B24B 49/12* (2006.01)
*B24B 57/02* (2006.01)
*G01N 15/0205* (2024.01)

(52) U.S. Cl.
CPC .............. *B24B 49/12* (2013.01); *B24B 57/02* (2013.01); *G01N 15/0211* (2013.01)

(58) Field of Classification Search
CPC ......... B24B 49/12; B24B 57/02; B24B 57/00; B24B 37/005; B24B 37/0044;
(Continued)

(56) References Cited

U.S. PATENT DOCUMENTS 6,104,490 A * 8/2000 Trainer .................. G01N 15/02 356/336
6,177,994 B1 1/2001 Watson et al.
(Continued)

FOREIGN PATENT DOCUMENTS

CN 101823234 A 9/2010
JP 2001150346 A 6/2001
(Continued)

OTHER PUBLICATIONS

English Abstract Translation of JP 2002154056 A.
(Continued)

*Primary Examiner* — Michael A Gump
(74) *Attorney, Agent, or Firm* — WPAT LAW; Anthony King

(57) ABSTRACT

A slurry monitoring device, a CMP system and a method of in-line monitoring a slurry are provided. The slurry monitoring device incudes a slurry metrology cell, a plurality of light sources, at least one optical lens, and at least one optical detector. The slurry metrology cell accommodates a slurry. The light sources emit light beams on the slurry in the slurry metrology cell. The at least one optical lens is disposed between the plurality of light sources and the slurry metrology cell. The at least one optical lens modifies a size of a light spot of the light beams impinged on the slurry. The at least one optical detector detects an intensity of the light beams scattered by abrasive particles in the slurry.

20 Claims, 14 Drawing Sheets

(58) Field of Classification Search
CPC ......... B24B 37/34; B24B 7/228; B24B 55/12; G01N 15/0211; G01N 15/1459; G01N 15/02; G01N 15/06; G01N 2015/0053; G01N 2015/1438; G01N 2015/0277; G01N 2015/0693; G01N 3/565; G01N 21/47; G01N 21/49; G01N 21/53; G01N 21/532; G01N 21/534; G01N 2021/4707; G01N 2021/4769; G01N 2223/314; G01N 2223/313; H01L 21/67017; H01L 21/67092; H01L 21/20635; H01L 21/3212; H01L 21/30625; H01L 22/00–10
USPC ...................................................... 451/6, 447
See application file for complete search history.

(56) References Cited

U.S. PATENT DOCUMENTS 10,613,012 B1 * 4/2020 Tatarkiewicz ......... G02B 21/36
2002/0180972 A1 * 12/2002 Ansari ............... G01N 15/0211 356/336
2004/0011975 A1 * 1/2004 Nicoli ................ G01N 15/0227 250/574
2006/0274309 A1 * 12/2006 Cerni ................. G01N 15/1459 356/338
2008/0218365 A1 * 9/2008 Kato .................... G08B 17/107 340/630
2010/0256918 A1 * 10/2010 Chen .................... C12Q 1/6869 250/208.2
2014/0331567 A1 11/2014 Takahashi et al.
2015/0117135 A1 * 4/2015 Chen ....................... B24B 57/02 366/142
2017/0241893 A1 * 8/2017 Walls ................. G01N 15/0205
2019/0383963 A1 * 12/2019 Hayashi ............. G01N 15/1459
2020/0240896 A1 * 7/2020 Karasikov .......... G01N 15/1459
2021/0181080 A1 * 6/2021 Zhang ................ G01N 15/1459

FOREIGN PATENT DOCUMENTS

JP 2002154056 A 5/2002
JP 2002154057 A 5/2002
WO 2010074002 A1 7/2010

OTHER PUBLICATIONS

U.S. Pat. No. 8,297,830 B2 is the US counterpart of CN 101823234 A.
English Abstract Translation of JP 2001150346 A.
English Abstract Translation of JP 2002154057 A.
English Abstract Translation of WO 2010074002 A1.

* cited by examiner

SLURRY MONITORING DEVICE, CMP SYSTEM AND METHOD OF IN-LINE MONITORING A SLURRY

PRIORITY CLAIM AND CROSS-REFERENCE

This application is a divisional application of U.S. patent application Ser. No. 17/460,046, filed on Aug. 27, 2021, entitled of "SLURRY MONITORING DEVICE, CMP SYSTEM AND METHOD OF IN-LINE MONITORING A SLURRY," which is incorporated herein by reference in its entirety.

BACKGROUND

Chemical mechanical polish (CMP) has been widely used in semiconductor integrated circuit (IC) fabrication. The wafer may suffer from scratch issue during CMP when the particle size of abrasive particles in the slurry becomes larger by e.g., aggregation. The scratch issue may cause damages to the wafers, and thus seriously affect the yield and reliability. It is therefore desirable to develop a slurry monitoring device to in-line monitor the quality of slurry.

BRIEF DESCRIPTION OF THE DRAWINGS

Aspects of the embodiments of the present disclosure are best understood from the following detailed description when read with the accompanying figures. It is noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
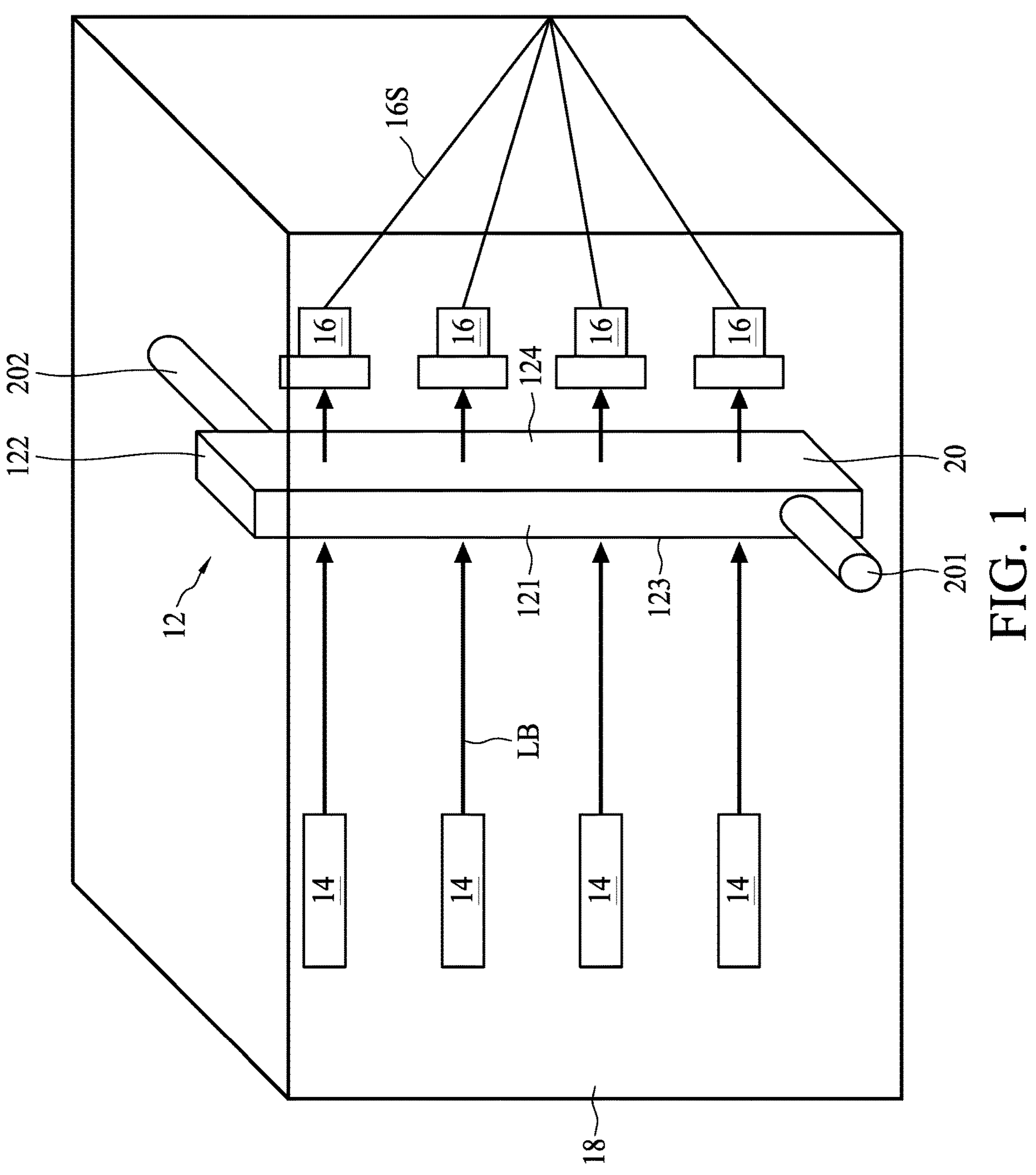
FIG. 1 is a schematic diagram of a slurry monitoring device in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation.

Chemical mechanical polishing (CMP) is an operation of smoothing surfaces with the combination of chemical and mechanical forces. The CMP can be treated as a hybrid of chemical etching and abrasive polishing. The CMP operation uses a slurry including abrasives and corrosive chemicals in conjunction with a polishing pad and retaining ring. The polishing pad and wafer are pressed together by a polishing head and held in place by a retaining ring. The polishing head may be rotated with different axes of rotation, which removes material and tends to smooth any irregular topography, making the wafer flat or planar. This flat or planar surface may facilitate formation of successive components. The slurry used in one CMP operation and/or CMP apparatus is recycled and reused in another CMP operation and/or CMP apparatus. As a result, the abrasive particles in the slurry may enlarge by e.g., aggregating or the amount of large size residues may increase in the slurry. The aggregated abrasive particles having larger size than a reference size of normal abrasive particles would scratch the wafer during CMP operation, and result in wafer damage and yield loss.

In some embodiments of the present disclosure, a slurry monitoring device and an in-line slurry monitoring method are provided. The slurry monitoring device is configured to optically detect particle size of the abrasive particles and other solid particles in the slurry, and thus can detect the particle aggregation in early time.

In some embodiments of the present disclosure, a CMP system is also provided. The CMP system includes two or more slurry supply units with their respective slurry supply pipe loops, and the slurry monitoring device is installed between and in communication with these slurry supply pipe loops. Once an oversize abrasive particle or residue is detected by the slurry monitoring device, one of the slurry supply pipe loops where the oversize abrasive particle or residue is detected is disconnected from the CMP apparatus such that the unfresh slurry is not delivered to the CMP apparatus, and the other one of the slurry supply pipe loops is connected to the CMP apparatus to provide the fresh slurry to the CMP apparatus.

FIG. 1 is a schematic diagram of a slurry monitoring device 1 in accordance with some embodiments of the present disclosure. As shown in FIG. 1, the slurry monitoring device 1 includes a slurry metrology cell 12, at least one light source 14 and at least one optical detector 16. The slurry metrology cell 12 is a container configured to accommodating a slurry 20. The slurry metrology cell 12 may include, but is not limited to, a cuboid shape. The material of the slurry metrology cell 12 may include glass or other suitable transparent material. The at least one light source 14 is configured to emit a light beam LB on the slurry 20 in the slurry metrology cell 12. In some embodiments, the at least one light source 14 may include, but is not limited to, a light emitting diode (LED) such as a blue light laser LED. By way of example, the slurry monitoring device 1 may include four blue light laser LEDs which can emit the light beam LB having a wavelength of about 380 nm to about 450 nm. The at least one optical detector 16 is configured to detect an intensity of the light beams LB scattered by abrasive particles in the slurry 20. In some embodiments, the at least one optical detector 16 may include, but is not limited to, a photodiode (PD). By way of example, the slurry monitoring device 1 may include four photodiodes to detect the intensity of the light beams LB emitted by the four blue light laser LEDs respectively and scattered by abrasive particles in the slurry 20. The intensity detected by the optical detector 16 may be converted into electrical signals 16S. The electrical signals 16S of the intensity of the light beams LB detected by the optical detector 16 may be amplified by amplifier and delivered to a controller for analysis. In some embodiments, the slurry metrology cell 12, the at least one light source 14 and the at least one optical detector 16 are enclosed by a black box 18 to reduce photo noise.

In some embodiments, the slurry metrology cell 12 may include a first side 121 and a second side 122 opposite to each other, and a third side 123 and a fourth side 124 opposite to each other. An inlet 201 of the slurry 20 may be disposed on a first side 121 of the slurry metrology cell 12, and an outlet 202 of the slurry 20 may be disposed on the second side 122 of the slurry metrology cell 12 such that the slurry 20 may flow from the first side 121 to the second side 122 of the slurry metrology cell 12. The at least one light source 14 may be disposed adjacent to the third side 123 of the slurry metrology cell 12, and the at least one optical detector 16 may be disposed adjacent to the fourth side 124 of the slurry metrology cell 124. In some embodiments, the inlet 201 and the outlet 202 of the slurry 20 are connected to a slurry supply pipe loop of a chemical mechanical polish (CMP) system, and thus the slurry monitoring device 1 can in-line monitor the slurry 20 of the CMP system. In some embodiments, the slurry 20 in slurry metrology cell 12 is, but not limited to, kept still during the optical monitoring process. By way of example, valves may be installed in the inlet 201 and the outlet 202 of the slurry 20 to control flow of the slurry 20.

Figures 2A, 2B, 2C:
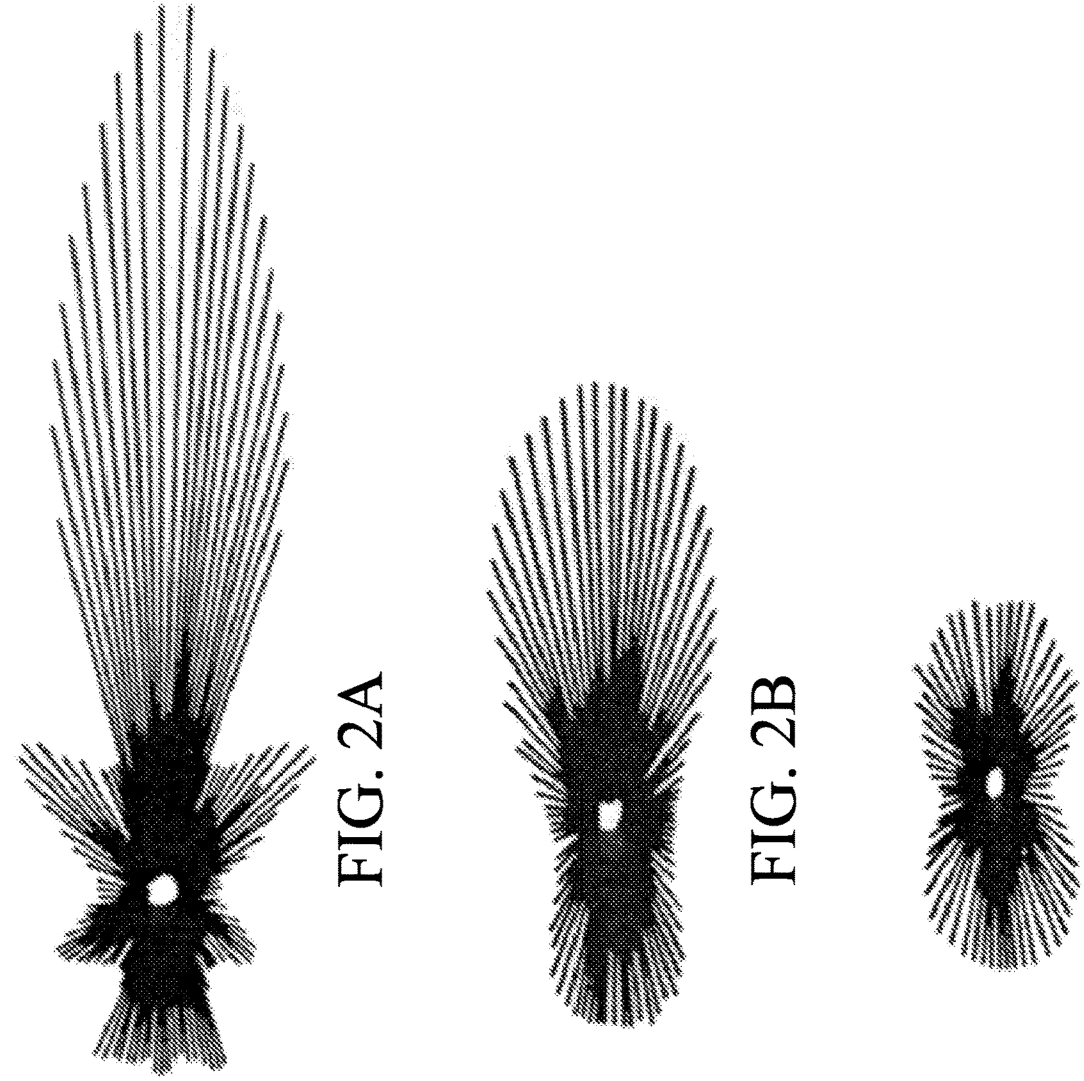
FIGS. 2A-2C are schematic diagrams illustrating angular intensity of different scattered light beams in accordance with some embodiments of the present disclosure.

The Tyndall effect is light scattering by particles in a colloid or in a very fine suspension. Under the Tyndall effect, the longer wavelengths are more transmitted while the shorter wavelengths are more diffusely reflected via scattering. The Tyndall effect is seen when light-scattering particulate matter is dispersed in an otherwise light-transmitting medium, and when the size (diameter) of an individual particle is somewhat below or near the wavelengths of visible light. The slurry 20 includes solvent, chemicals and abrasive particles, and thus is a kind of colloid or a fine suspension. Therefore, the Tyndall effect can be seen in the slurry 20, and the size of the abrasive particle in the slurry 20 can be detected by identifying the intensity of scattered light in the slurry 20 under the Tyndell effect. FIGS. 2A-2C are schematic diagrams illustrating angular intensity of different scattered light beams in accordance with some embodiments of the present disclosure. FIG. 2A schematically depicts an angular intensity of scattered light beam and/or reflected light beam when the size of the particle is larger than the wavelength of the light beam, FIG. 2B schematically depicts an angular intensity of scattered light beam and/or reflected light beam when the size of the particle is about 0.25 the wavelength of the light beam, and FIG. 2C schematically depicts an angular intensity of scattered light beam and/or reflected light beam when the size of the particle is about 0.1 the wavelength of the light beam. As can be seen in FIGS. 2A-2C, larger particles scatter light beam through smaller angles, while smaller particles scatter light beam through larger angles. Accordingly, the size of the abrasive particle in the slurry 20 can be detected by identifying the intensity of scattered light in the slurry 20 under the Tyndell effect. By detecting the size of the abrasive particle in the slurry 20, the freshness of the slurry 20 can be known.

In some embodiments, the light sources 14 can emit light beams LB of different wavelengths. By way of example, a first light source can emit a light beam of a shorter wavelength, and a second light source can emit a light beam of a longer wavelength. The group of light sources 14 that emits light beams LB of different wavelengths can be used to dynamically detect the change of slurry 20. For example, the light beam LB of smaller wavelength can be used to detect the numbers of abrasive particles having a first size, which is slightly larger than the normal size of abrasive p articles. The light beam LB of larger wavelength can be used to detect the numbers of abrasive particles having a second size, which is larger than the first size. By dynamically detecting the proportion of the abrasive particles having the first size and the second size, the freshness of the slurry 20 can be precisely monitored.

Figure 3:
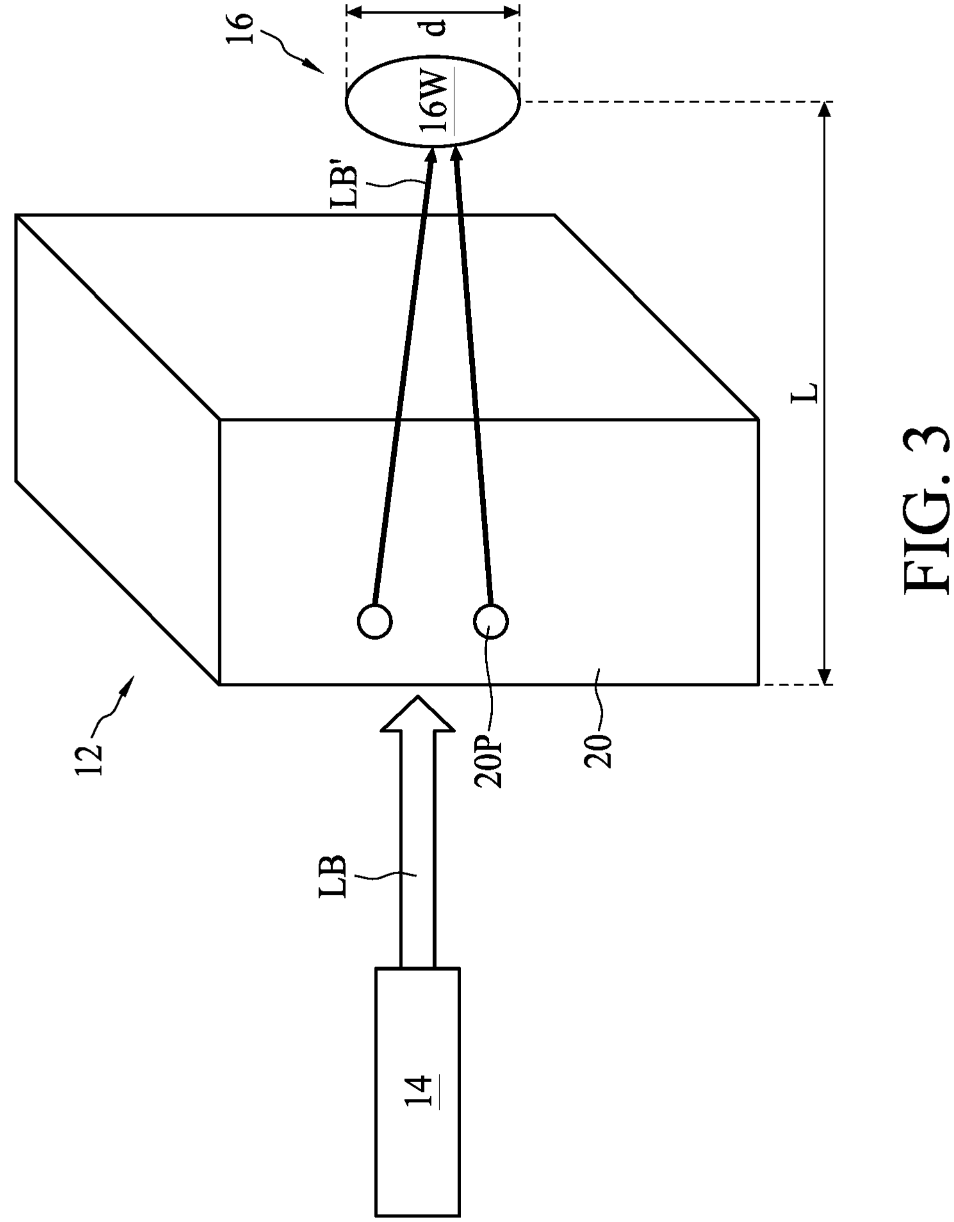
FIG. 3 is an enlarged schematic diagram of a slurry monitoring device in accordance with some embodiments of the present disclosure.

FIG. 3 is an enlarged schematic diagram of a slurry monitoring device 1 in accordance with some embodiments of the present disclosure. As shown in FIG. 3, the slurry monitoring device 1 includes a slurry metrology cell 12, a light source 14 and an optical detector 16. The slurry 20 is stored in the slurry metrology cell 12. The light source 14 may be a point light source, which emits a light beam LB on the slurry 20 in the slurry metrology cell 12. The optical detector 16 includes an optical sensing window 16W. The light beam LB emitted by the light source 14 is impinged on the slurry 20, and scattered or diffracted by many abrasive particles 20P, to generate a plurality of scattered light beams LB'. The scattered light beams LB' enter the optical sensing window 16W and the intensity of the scattered light beams LB' is detected by the optical detector 16. The estimated sizes of the abrasive particles 20P in the slurry 20 can be obtained based on the intensity of the scattered light beam LB'.

As schematically illustrated in FIG. 3, the light beam LB may encounter two abrasive particles 20P, which are close to each other. Therefore, the distance L between the optical sensing window 16W and the slurry metrology cell 12 needs to be controlled to clearly identify two adjacent abrasive particles 20P. In some embodiments, Rayleigh criterion is applied to set the distance L between the optical sensing window 16W and the slurry metrology cell 12.

Theoretically, the light beam LB coming from the point light source 12 in the object diffracts through the lens aperture such that it forms a diffraction pattern in the abrasive particles 20P, which has a central spot and surrounding bright rings, separated by dark nulls. This pattern is known as an Airy pattern, and the central bright lobe as an Airy disk. The angular radius of the Airy disk (measured from the center to the first null) is given by:

$$R = \frac{1}{\theta} = \frac{d}{1.22\ \lambda} \tag{1}$$

$$\theta = d/L \tag{2}$$

where

R is Rayleigh quotient;

θ is the angular resolution in radians;

λ is the wavelength of the light beam;

d is the diameter of the optical sensing window; and

L is the distance between the optical sensing window and the slurry metrology cell.

By virtue of the above equations, the minimum Rayleigh quotient R and the minimum distance L between the optical sensing window and the slurry metrology cell can be obtained.

The abrasive particles 20P in the fresh slurry 20 may have a normal size, and a reference size can be set based on the normal size in the fresh slurry 20. When the size becomes larger than the reference size, the abrasive particles 20P in the slurry 20 may cause micro scratch. In such a case, the slurry 20 may be regarded as unfresh slurry. In some embodiments, the normal size (diameter) of abrasive particles in average in the slurry 20 for CMP operation is between about 30 nm and about 70 nm, and a reference size may be set at about 100 nm. In case the aggregated abrasive particles have a size (diameter) larger than 100 nm, the abrasive particles would cause micro scratch and damage the wafer. Therefore, the wavelength of the light beam LB can be selected such that the oversized abrasive particle in the slurry 20 can be accurately detected. By way of example, the wavelength of the light beam LB is about 400 nm.

By way of example, the diameter d of the optical sensing window 16W is about 0.5 mm, and the wavelength A of the light beam LB is about 400 nm. Accordingly, the estimated minimum Rayleigh quotient R is about 1000, and the estimated minimum distance L between the optical sensing window 16W and the slurry metrology cell 12 is about 500 mm. The optical resolution of the slurry monitoring device can be enhanced for example by multiply the minimum Rayleigh quotient R by 10, and the minimum distance L between the optical sensing window 16W and the slurry metrology cell 12 can be set to be less than about 50 mm. The distance L between the optical sensing window 16W and the slurry metrology cell 12 can be modified based on the optical requirement of the slurry monitoring device or other considerations. For example, because the minimum distance L between the optical sensing window 16W and the slurry metrology cell 12 can be reduced to be less than about 50 mm, the volume of the slurry monitoring device can be compact enough to fit in CMP system.

The slurry monitoring device, CMP system and in-line slurry monitoring method of the present disclosure are not limited to the above-described embodiments, and may be implemented according to other embodiments. To streamline the description and for the convenience of comparison between various embodiments of the present disclosure, similar components of the following embodiments are marked with same numerals, and may not be redundantly described.

Figure 4:
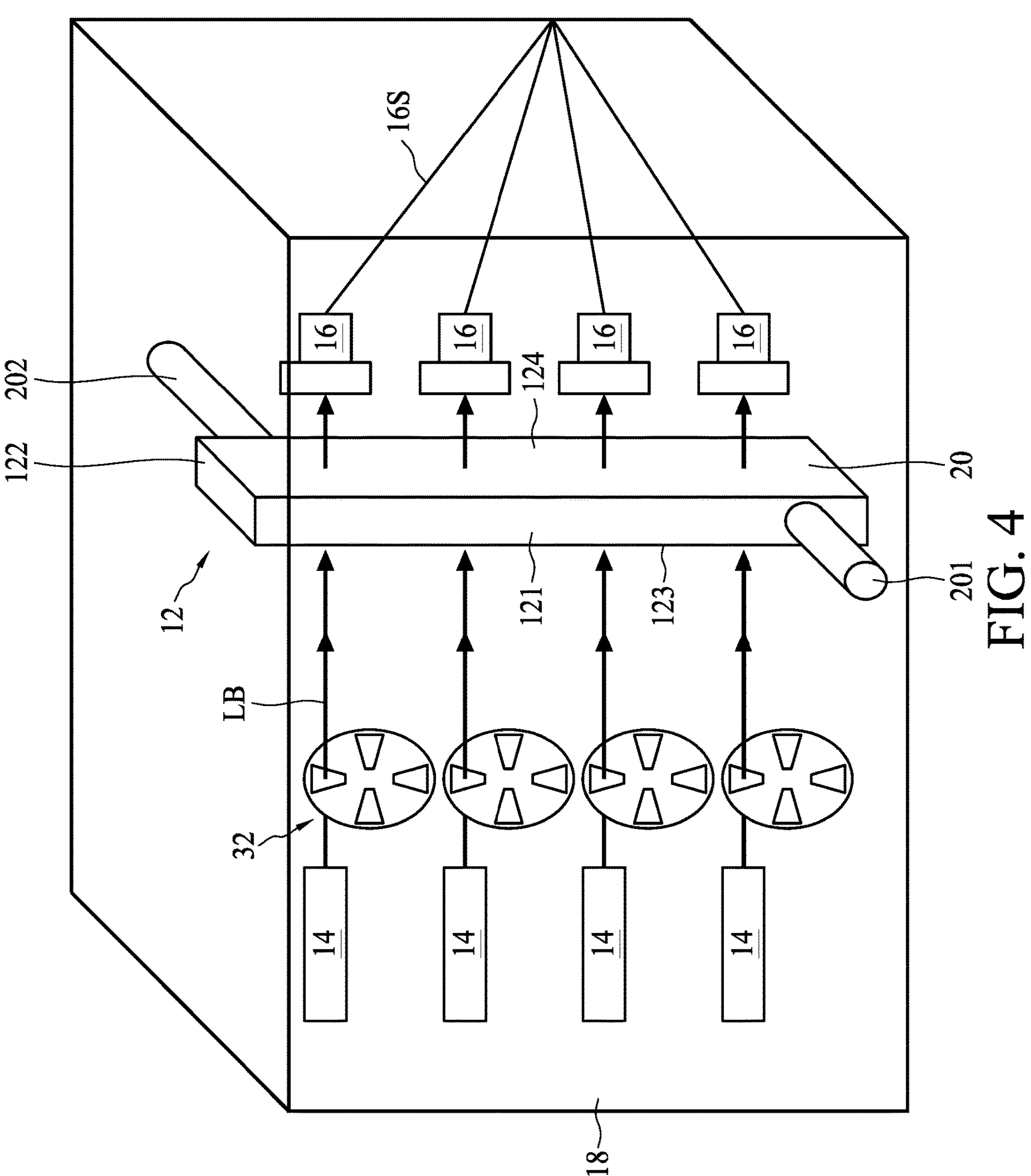
FIG. 4 is a schematic diagram of a slurry monitoring device in accordance with some embodiments of the present disclosure.
Figure 4A:
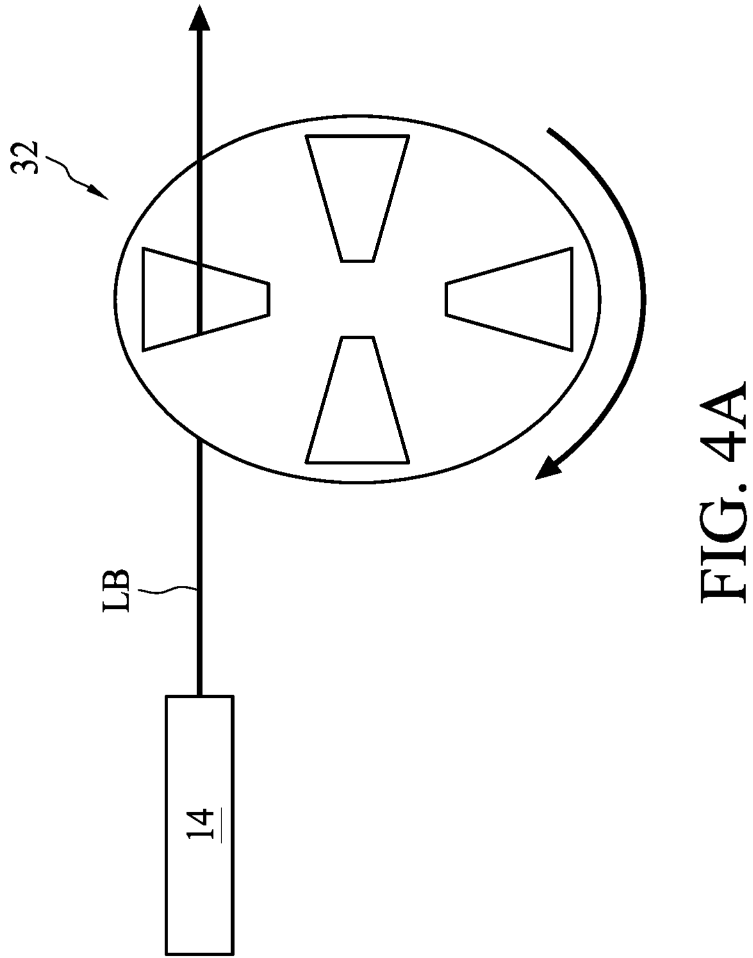
FIG. 4A is a schematic diagram of an optical chopper accordance with some embodiments of the present disclosure.

FIG. 4 is a schematic diagram of a slurry monitoring device 2 in accordance with some embodiments of the present disclosure, and FIG. 4A is a schematic diagram of an optical chopper accordance with some embodiments of the present disclosure. As shown in FIG. 4, in contrast to the slurry monitoring device 1 of FIG. 1, the slurry monitoring device 2 may further include at least one optical chopper 32 disposed between the at least one light source 14 and the slurry metrology cell 12, and configured to modify a pulse duration of the light beam LB. Because the abrasive particles with nanometer scales in the slurry is not static, the abrasive particles may do random motion in the slurry, which is known as Brownian motion. Empirically, the speed of a nanoparticle having a size of 10 nm and 100 nm are respectively about 9 um/s and 3 um/s. The optical chopper 32 is used to compensate for the bias that adversely affects the signal of light scattering detected by the optical detector due to the undesired displacement of the abrasive particles by Brownian motion.

The optical chopper 32 is a device which periodically interrupts the light beam LB to modify the pulse duration (or angular frequency). In some embodiments, the optical chopper 32 may include a rotating disc shutters. The optical chopper 32 is used to modulate the pulse duration of the light beam LB to mitigate the impact of Brownian motion of the abrasive particles 20P. A reference pulse duration ΔT of the light beam LB can be determined by diving the particle size by the speed of the particle.

In case the reference size of the abrasive particle 20P is 100 nm and the speed of the abrasive particle 20P of 100 nm, the reference pulse duration ΔT of the light beam LB is about 0.033 seconds. The pulse duration of the light beam LB is set to be less than 0.033 seconds to mitigate the impact of Brownian motion of the abrasive particles 20P.

In some embodiments, the slurry monitoring device 2 may include a plurality of optical choppers 32, and the optical choppers 32 are arranged corresponding to the plurality of light sources 14. By way of example, four optical choppers 32 are used to modulate the light beams LB of four light sources 14 respectively, as illustrated in FIG. 4A. The four light sources 14 may emit the light beams LB of substantially the same wavelength, and the four optical choppers 32 may have the same pulse duration or different pulse durations. The optical choppers 32 may include different optical choppers 32. In some embodiments, the optical choppers 32 may have different pulse durations. By way of example, the optical choppers 32 may include a first optical chopper corresponding to the first light source and having a first pulse duration, and a second optical chopper corresponding to the second light source and having a second pulse duration. In some embodiments, the wavelength of the light beam LB emitted by the first light source is shorter than the wavelength of the light beam LB emitted by the second light source, and the first pulse duration of the first optical chopper is longer than the second pulse duration of the second optical chopper. The pulse duration of the optical chopper 32 may be modified by changing the angular frequency and/or the size of the holes.

Figure 4B:
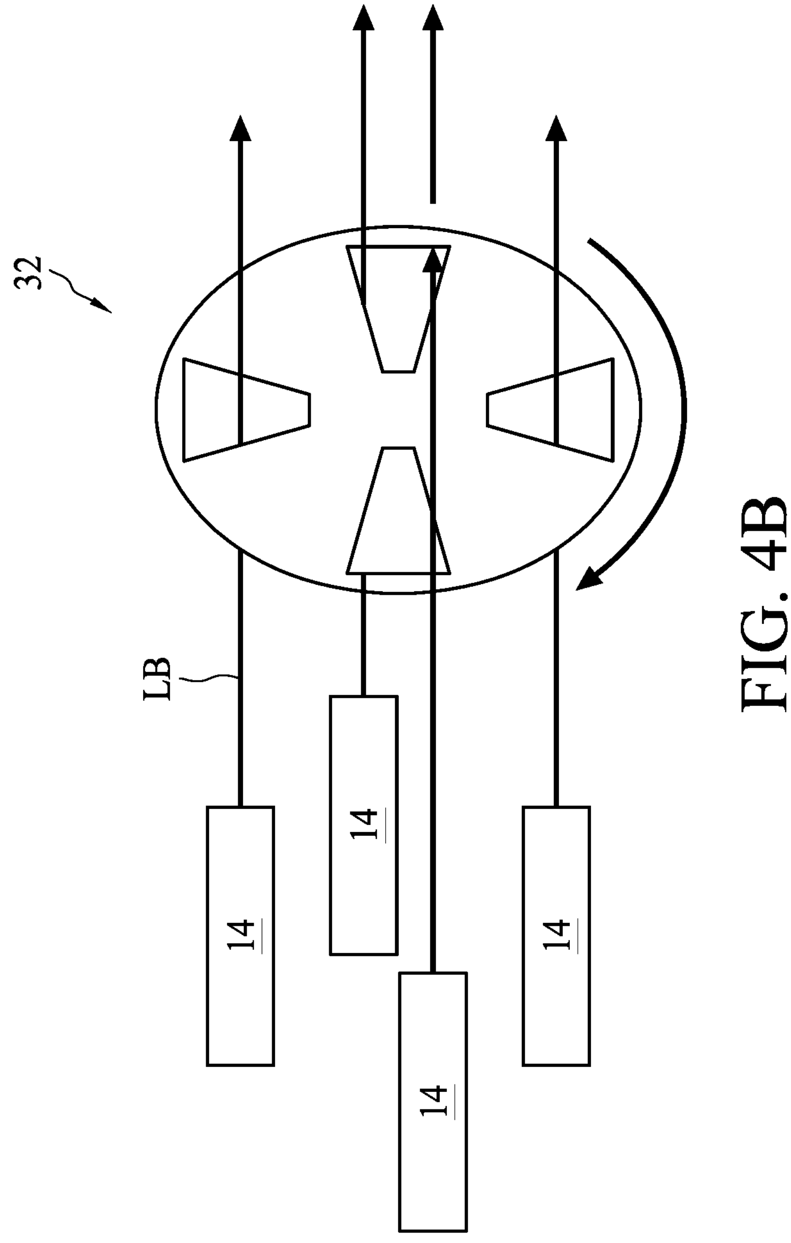
FIG. 4B is a schematic diagram of an optical chopper accordance with some embodiments of the present disclosure.

FIG. 4B is a schematic diagram of an optical chopper accordance with some embodiments of the present disclosure. In contrast to FIG. 4A, one optical chopper 32 may be used to modulate the light beams BM for all four light sources 14 as illustrated in FIG. 4B.

Figure 4C:
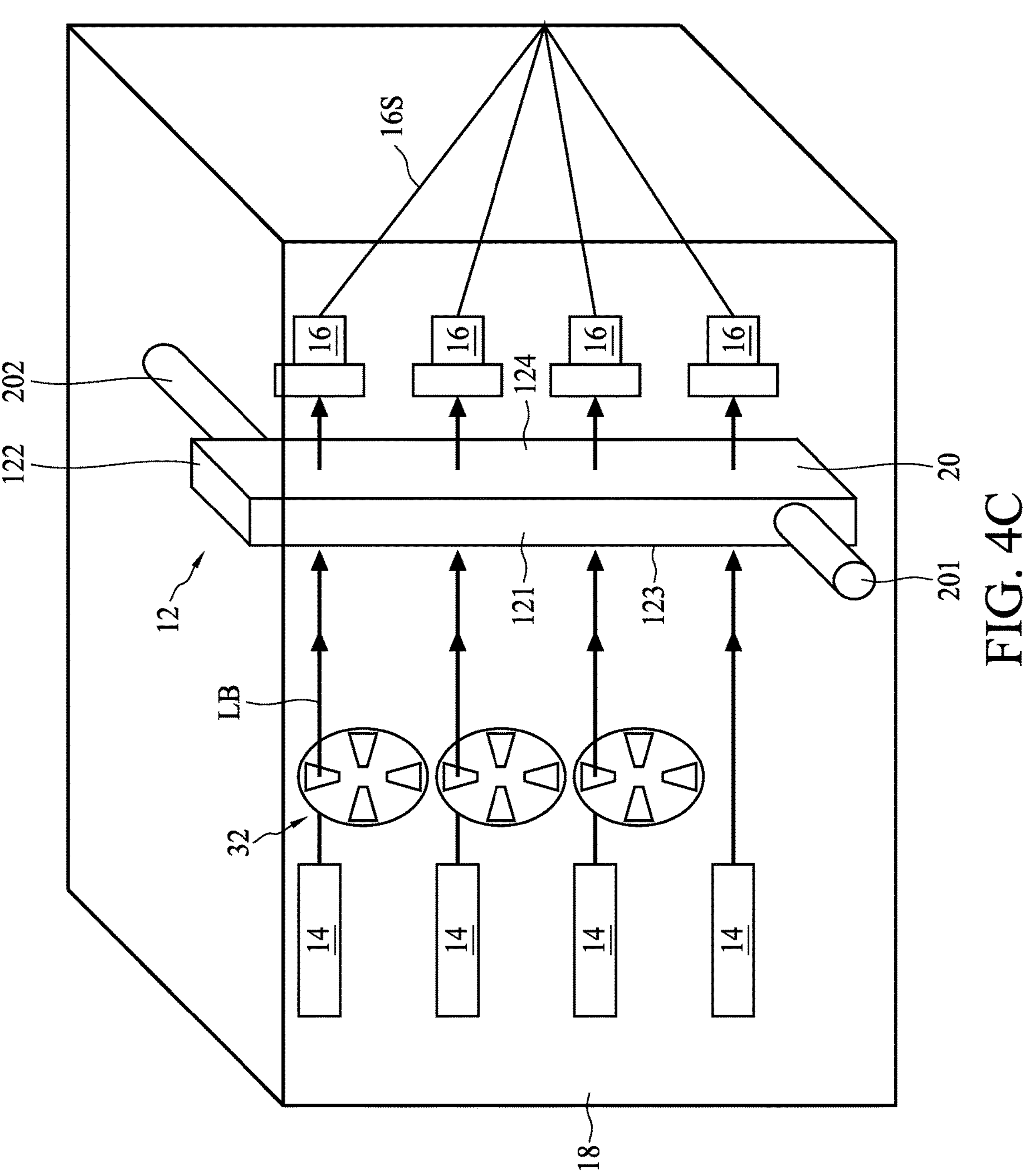
FIG. 4C is a schematic diagram of a slurry monitoring device in accordance with some embodiments of the present disclosure.

FIG. 4C is a schematic diagram of a slurry monitoring device 2' in accordance with some embodiments of the present disclosure. As shown in FIG. 4C, in contrast to the slurry monitoring device 2 of FIG. 4, the number of the light sources 14 and the number of the optical choppers 32 are not identical. By way of example, the light beams LB emitted from all the light sources 14 may have substantially the same wavelength. The light beams LB of the same wavelength emitted from some of the light sources 14 may pass the optical choppers 32 having different pulse durations (including different frequencies and/or different hole sizes). In addition, the light beam(s) LB emitted from some other light sources 14 does not pass the optical chopper(s) 32. By virtue of the arrangement of the light sources 14 of the same wavelength with and without the optical choppers 32 of different pulse durations, a variety of information of the abrasive particles can be obtained. For example, the arrangement of the light sources 14 of the same wavelength with and without the optical choppers 32 of different pulse durations can be used to dynamically detect the change of slurry 20. The light beam LB passing high frequency optical chopper 32 can be used to detect the numbers of abrasive particles having a first size, which is slightly larger than the normal size of abrasive p articles. The light beam LB passing low frequency optical chopper 32 can be used to detect the numbers of abrasive particles having a second size, which is larger than the first size. By dynamically detecting the proportion of the abrasive particles having the first size and the second size, the freshness of the slurry 20 can be precisely monitored.

Figure 5:
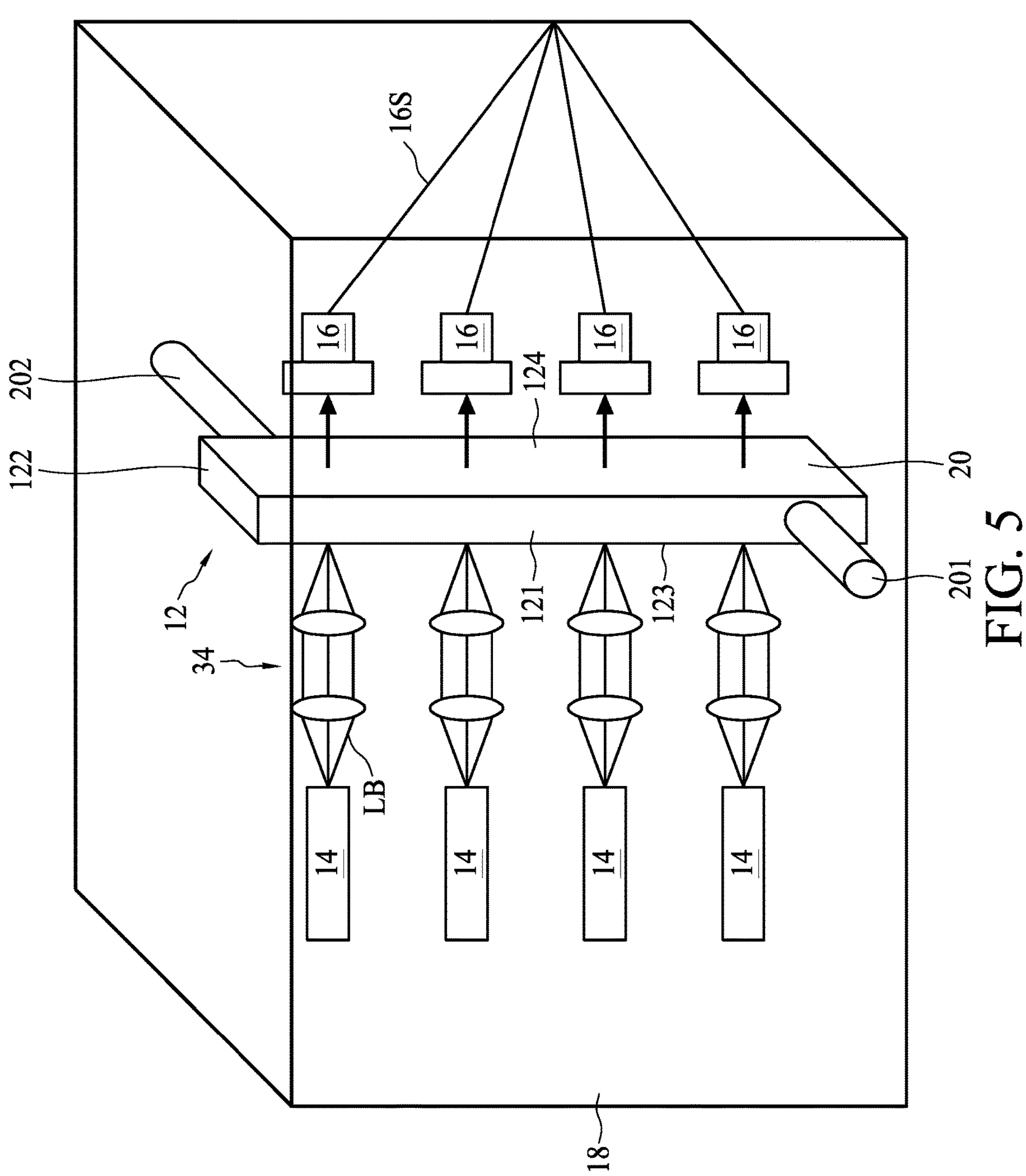
FIG. 5 is a schematic diagram of a slurry monitoring device in accordance with some embodiments of the present disclosure.

FIG. 5 is a schematic diagram of a slurry monitoring device 3 in accordance with some embodiments of the present disclosure. As shown in FIG. 5, the slurry monitoring device 3 may further include at least one optical lens 34 disposed between the at least one light source 14 and the slurry metrology cell 12, and configured to modify a size (e.g. diameter) of a light spot of the light beam LB impinged on the slurry 20. In some embodiments, the optical lens 34 may include focus lens configured to focus the light beam LB. The slurry monitoring device 3 may include a plurality of optical lenses 34, and the optical lenses 34 are arranged corresponding to the plurality of light sources 14. By way of example, four optical lenses 34 are used to modulate the size of a light spot of the light beams LB of four light sources 14 respectively. In some other embodiments, one optical lens 34 may be used to modulate the size of a light spot for all four light sources 14.

Figure 5A:
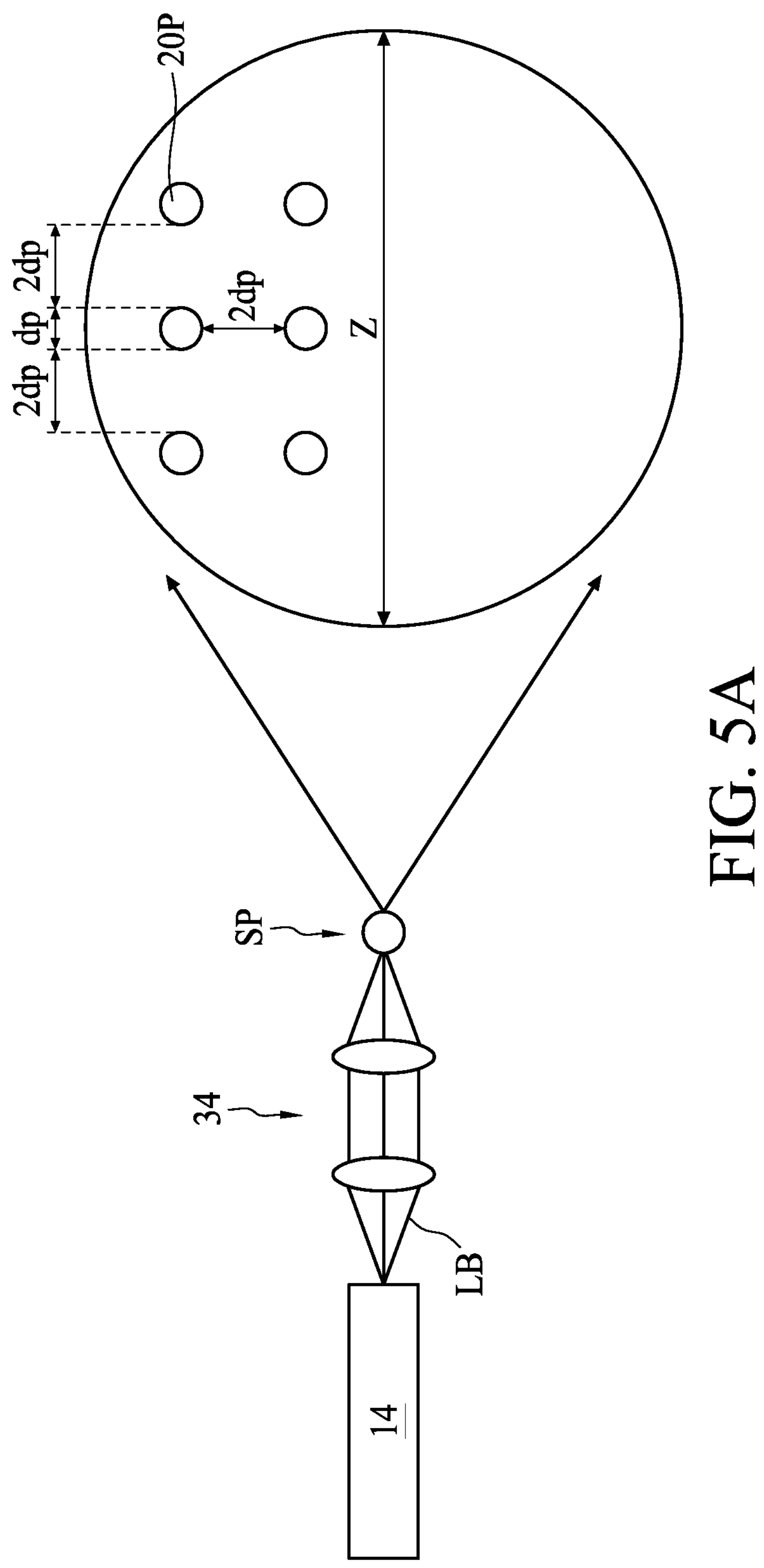
FIG. 5A is an enlarged schematic diagram of an optical lens in accordance with some embodiments of the present disclosure.

FIG. 5A is an enlarged schematic diagram of an optical lens in accordance with some embodiments of the present disclosure. As shown in FIG. 5A, the size of a light spot SP of the light beam LB can be modulate to cover sufficient numbers of abrasive particles 20P such that sufficient numbers of the abrasive particles 20P can be detected to enhance the electrical signal. In some embodiments, the distance 2*dp* between two adjacent abrasive particles 20P is twice the diameter dp of the abrasive particle 20P. For example, the diameter dp of the abrasive particle 20P is about 100 nm, and the distance 2*dp* between two adjacent abrasive particles 20P is about 200 nm. It is assumed that more than 100 aggregated particles shall be detected to improve the electrical signal. Also, the spec of slurry freshness for particle aggregation is less than 5% of total particle number, and the area of light spot SP shall cover more than 2000 abrasive particles 20P to ensure that more than 100 aggregated particles can be detected. In some embodiments, the area of light spot SP is larger than or equal to about 141 $um^2$ ($(3*100\ nm)^2*2000*\pi/4$), and the diameter Z of the light spot SP is about 13 um.

Figure 6:
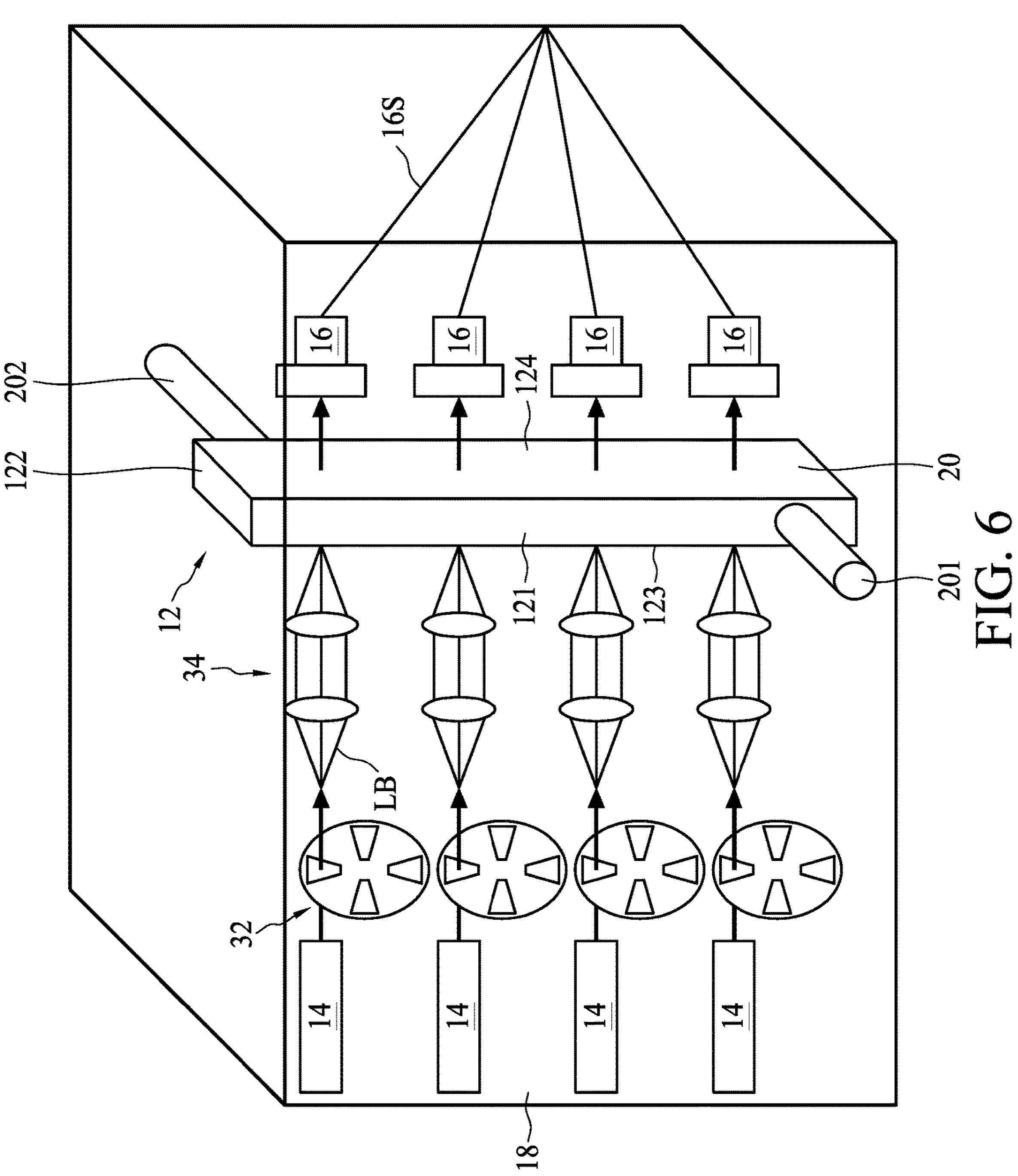
FIG. 6 is a schematic diagram of a slurry monitoring device in accordance with some embodiments of the present disclosure.

FIG. 6 is a schematic diagram of a slurry monitoring device 4 in accordance with some embodiments of the present disclosure. As shown in FIG. 6, the slurry monitoring device 4 may include at least one optical chopper 32 and at least one optical lens 34 disposed between the at least one light source 14 and the slurry metrology cell 12. In some embodiments, the optical chopper 32 is disposed between the at least one light source 14 and the at least one optical lens 34. The pulse duration of the light beam LB can be modulated before the size of the light spot of light beam LB is modulated.

Figure 7:
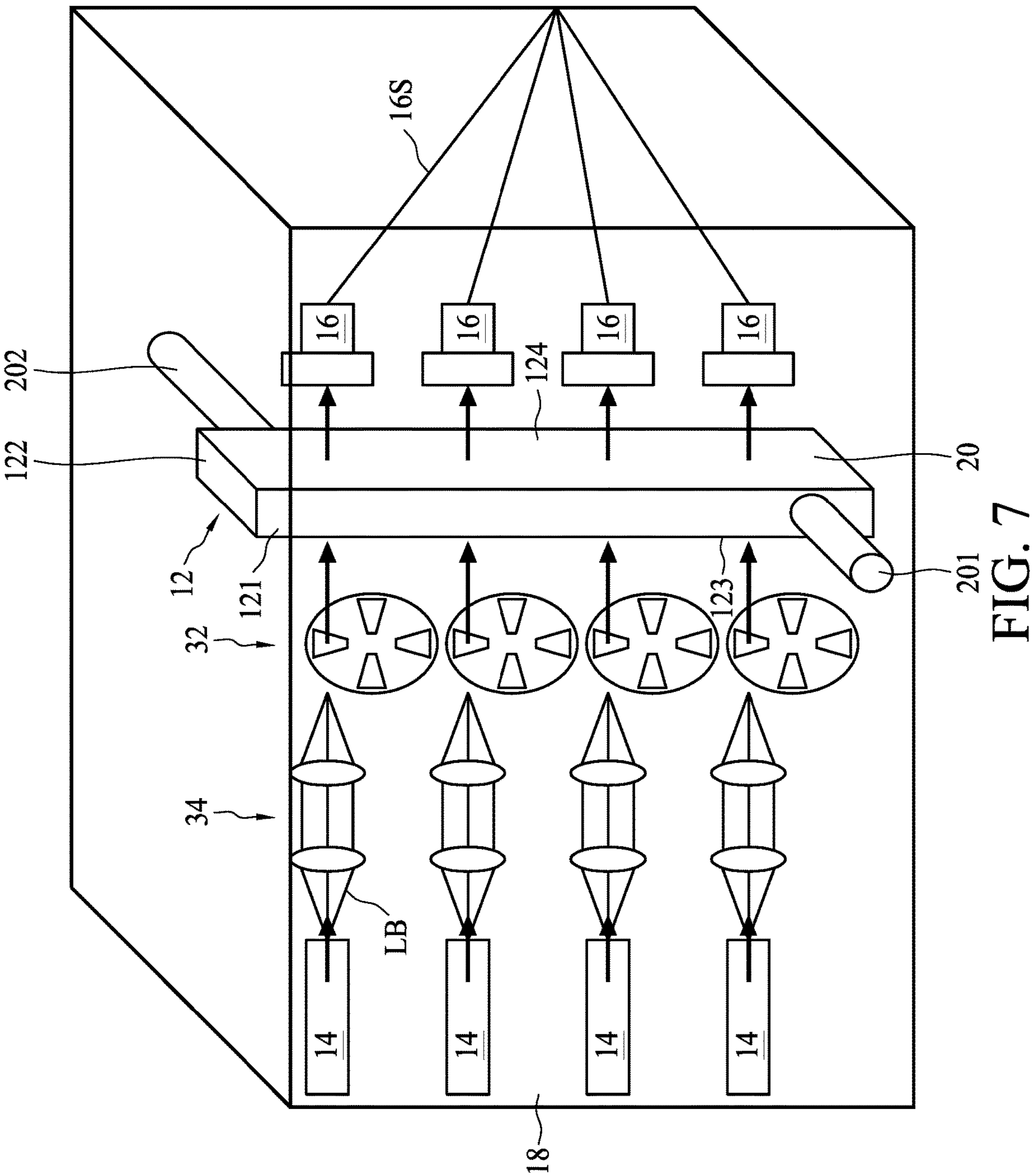
FIG. 7 is a schematic diagram of a slurry monitoring device in accordance with some embodiments of the present disclosure.

FIG. 7 is a schematic diagram of a slurry monitoring device 5 in accordance with some embodiments of the present disclosure. As shown in FIG. 7, the optical chopper 32 is disposed between the optical lens 34 and the slurry metrology cell 12. The size of the light spot of light beam LB is modulated before the pulse duration of the light beam LB is modulated.

Figure 8:
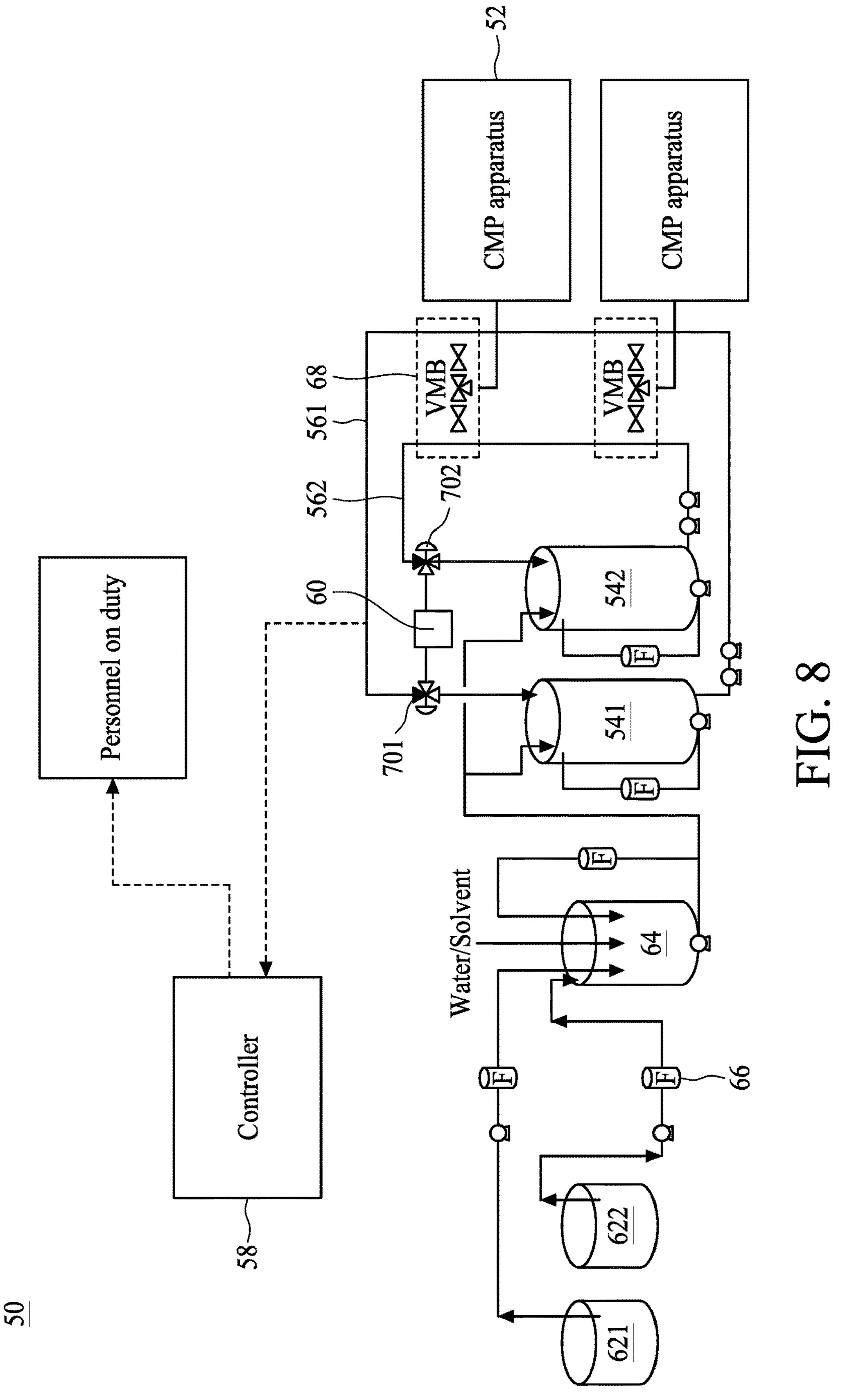
FIG. 8 is a schematic diagram of a chemical mechanical polish (CMP) system 50 in accordance with some embodiments of the present disclosure.
Figure 8A:
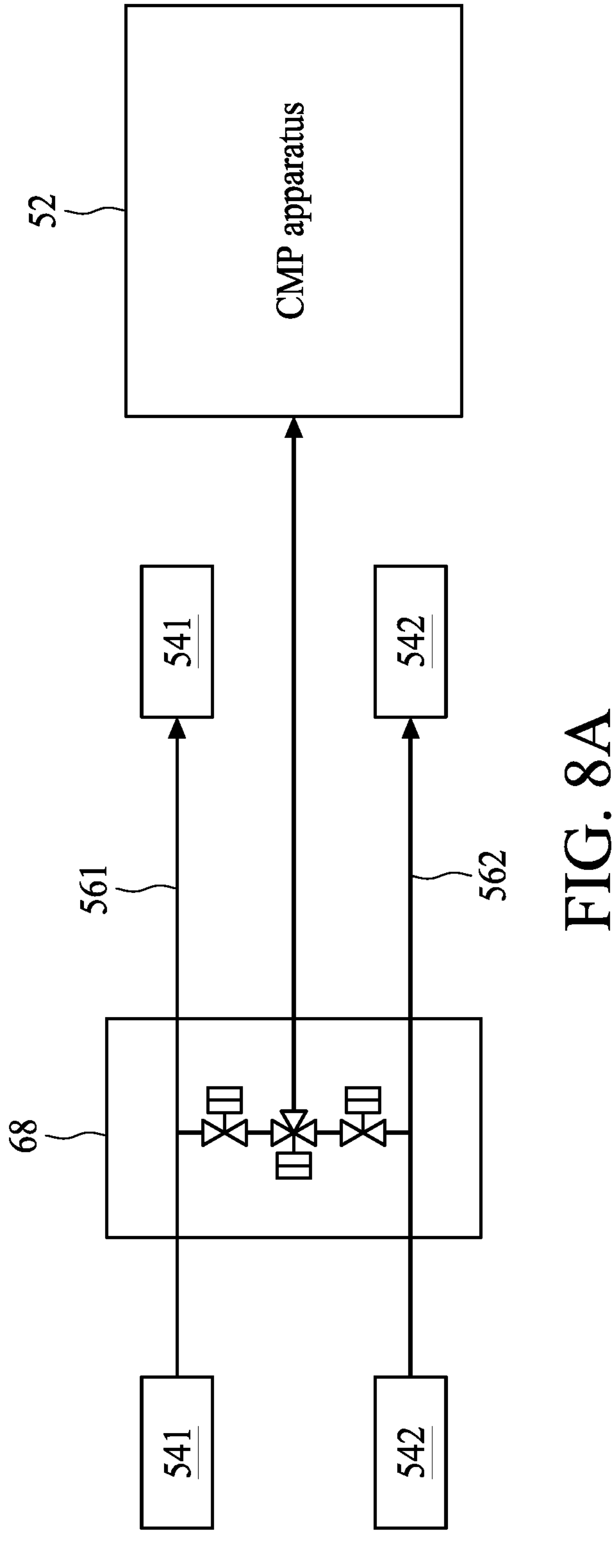
FIG. 8A is a schematic diagram illustrating loop switch of a CMP system.

FIG. 8 is a schematic diagram of a chemical mechanical polish (CMP) system 50 in accordance with some embodiments of the present disclosure, and FIG. 8A is a schematic diagram illustrating loop switch of a CMP system. As shown in FIG. 8, the CMP system 50 includes at least one CMP apparatus 52, a first slurry supply unit 541 and a second slurry supply unit 542 configured to supply slurry to the CMP apparatus 52. The CMP system 50 further includes a first slurry supply pipe loop 561 connected to the first slurry supply unit 541 and the at least one CMP apparatus 52, and a second slurry supply pipe loop 562 connected to the second slurry supply unit 542 and the at least one CMP apparatus 52. In some embodiments, the CMP system 50 may further include a first drum 621, a second dram 622 and a mixing tanks 64, and pumps 66 and flow meters F installed in the first slurry supply pipe loop 561 and the second slurry supply pipe loop 562. In addition, valve manifold box (VMB) 68 can be used to switch between communication of the CMP apparatus 52 and the first slurry supply pipe loop 561 and communication of the CMP apparatus 52 and the second slurry supply pipe loop 562. The slurry in the first drum 621 and/or the second drum 622 may be mixed in the mixing tank 64, and water and/or solvent can be mixed with the slurry in the mixing tank 64.

As shown in FIG. 8, the slurry monitoring device 60 is connected to the first slurry supply pipe loop 561 and the second slurry supply pipe loop 562, and configured to monitor a quality of the slurry such as a freshness of the slurry. In some embodiments, the slurry metrology cell 12 of the slurry monitoring device 60 is connected to slurry return lines of the first slurry supply pipe loop 561 and the second slurry supply pipe loop 562 such that the status of the slurry in the CMP apparatus 52 can be monitored more accurately. The slurry monitoring device 60 can be selected from any of the slurry monitoring device illustrated in the above embodiments, and details of the slurry monitoring device 60 are not redundantly described. Valves such as a first valve 701 and a second valve 702 may be used to switch between the communication of the slurry monitoring device 60 and the first slurry supply pipe loop 561 and the communication of the slurry monitoring device 60 and the second slurry supply pipe loop 562. The slurry monitoring device 60 may drain the slurry from either the first slurry supply pipe loop 561 or the second slurry supply pipe loop 562, and in-line monitors the slurry. In some embodiments, the CMP system 50 further includes a controller 58 such as a computer electrically connected to the slurry monitoring device 60, and configured to control the slurry monitoring device 60. In some embodiments, the controller 58 may switch between the communication of the slurry monitoring device 60 and the first slurry supply pipe loop 561 and the communication of the slurry monitoring device 60 and the second slurry supply pipe loop 562.

As shown in FIG. 8A, in case the freshness of the slurry in the first slurry supply pipe loop 561 is found unfresh by the slurry monitoring device 60, the loop may be switched from the first slurry supply pipe loop 561 to the second slurry supply pipe loop 562. In such a case, the communication of the CMP apparatus 52 and the first slurry supply pipe loop 561 is turned off such that the unfresh slurry is prevented from entering the CMP apparatus 52. On the other hand, the communication of the CMP apparatus 52 and the second slurry supply pipe loop 562 is turned on to supply fresh slurry to the CMP apparatus 52. In some other embodiments, the controller 58 can send notification to operator on duty to take proper measures.

Figure 9:
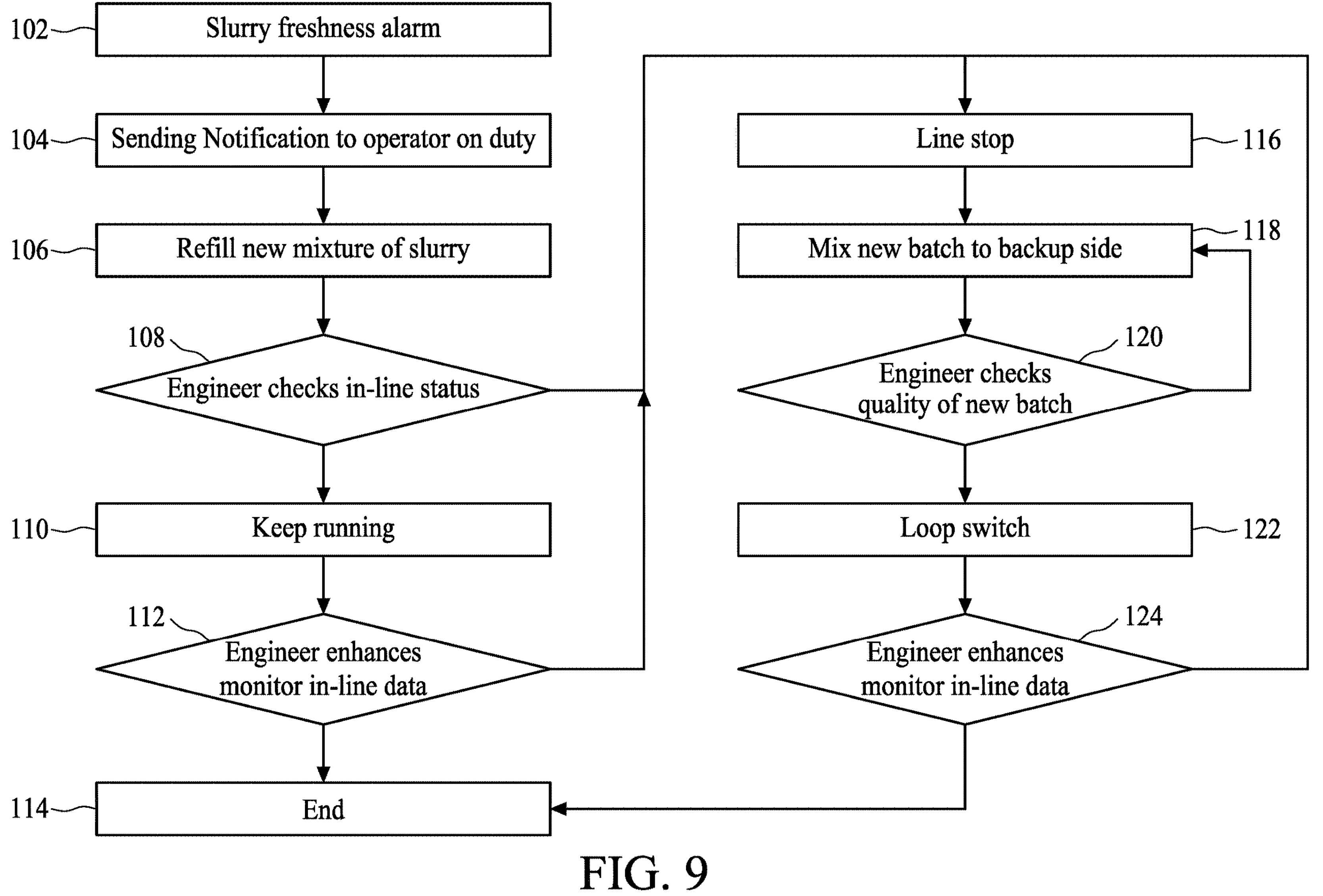
FIG. 9 is a flow chart illustrating a method of in-line monitoring a slurry and managing CMP system in accordance with some embodiments of the present disclosure.

Refer to FIG. 9. FIG. 9 is a flow chart illustrating a method of in-line monitoring a slurry and managing CMP system in accordance with some embodiments of the present disclosure. In some embodiments, the slurry is conducted from the first slurry supply pipe loop 561 to the slurry metrology cell 60. In operation 102, a slurry freshness alarm is received if the estimated sizes of the abrasive particles 20P are larger than a reference size of the abrasive particle 20P as illustrated above. The slurry freshness alarm may be sent from the controller 58, based on the result of in-line monitoring of the slurry. By way of example, the slurry provided by the first slurry supply pipe loop 561 is detected unfresh, which would trigger a slurry freshness alarm. In operation 104, a notification of the slurry freshness alarm is sent to the operator on duty. In operation 106, the slurry provided by the first slurry supply pipe loop 561 is abandoned, and new mixture of the slurry is refilled in the first slurry supply pipe loop 561. In operation 108, the engineer checks if the in-line status is normal. If the in-line status is normal, the first slurry supply pipe loop 561 keeps running to provide the new mixture of slurry to the CMP apparatus 52 as illustrated in operation 110; if the in-line status is abnormal such as the slurry is detected out of specification, the first slurry supply pipe loop 561 is shut as illustrated in operation 112. In operation 112, the engineer enhances the in-line monitor data and checks if the in-line status is normal. If the in-line status is normal, the first slurry supply pipe loop 561 keeps running to provide the new mixture of slurry to the CMP apparatus 52, and the slurry freshness alarm is end as illustrated in operation 114. If the in-line status is abnormal, the first slurry supply pipe loop 561 is shut down as illustrate in operation 116. In operation 118, a new batch of mixture of slurry is mixed and delivered to a second slurry supply pipe loop 562. In operation 120, the freshness of new batch of mixture of slurry is checked. If the freshness of new batch of mixture of slurry is abnormal, the new batch of mixture of slurry is abandoned, and another new batch of mixture of slurry is mixed and delivered to a second slurry supply pipe loop 562 as illustrated in operation 118. If the freshness of new batch of mixture of slurry is normal, the loop is switch to the second slurry supply pipe loop 562 to provide the new batch of mixture of slurry to the CMP apparatus 52 as illustrated in operation 122. In operation 124, the engineer enhances the in-line monitor data and checks if the in-line status of the new batch of mixture of slurry in the second slurry supply pipe loop 562 is normal. If the in-line status is normal, the second slurry supply pipe loop 562 keeps running to provide the new batch of mixture of slurry to the CMP apparatus 52, and the slurry freshness alarm is end as illustrated in operation 114. If the in-line status is abnormal, the method proceeds with operation 108 again.

The method 100 is merely an example, and is not intended to limit the present disclosure beyond what is explicitly recited in the claims. Additional operations can be provided before, during, and after the method 100, and some operations described can be replaced, eliminated, or moved around for additional embodiments of the method.

As described, the abrasives in the slurry will aggregate and enlarge when the slurry is used again and again. Consequently, the freshness of the slurry can be determined by checking its abrasive size. The larger the abrasive size, the less fresh the slurry is. In some embodiments of the present disclosure, a slurry monitoring device and an in-line slurry monitoring method are provided. The slurry monitoring device is configured to optically detect particle size of the abrasive particles and other solid particles in the slurry, and thus can detect the particle aggregation in early time. In some embodiments of the present disclosure, a CMP system is also provided. The CMP system includes two or more slurry supply units with their respective slurry supply pipe loops, and the slurry monitoring device is installed between and in communication with these slurry supply pipe loops. Once an oversize abrasive particle or residue is detected by the slurry monitoring device, one of the slurry supply pipe loops where the oversize abrasive particle or residue is detected is disconnected from the CMP apparatus such that the unfresh slurry is not delivered to the CMP apparatus, and the other one of the slurry supply pipe loops is connected to the CMP apparatus to provide the fresh slurry to the CMP apparatus. The slurry monitoring method uses an optical detecting mechanism to in-line check the quality of the slurry by measuring the size of the abrasive particles. The optical detecting mechanism is a non-destructive mechanism, which can real time check the freshness of the slurry, and thus yield of the CMP operation can be improved.

In some embodiments, a slurry monitoring device includes a slurry metrology cell, a plurality of light sources and at least one optical detector. The slurry metrology cell is configured to accommodating a slurry. The light sources are configured to emit a light beam on the slurry in the slurry metrology cell. The light sources include a first light source configured to emit a first light beam having a first wavelength, and a second light source configured to emit a second light beam having a second wavelength longer than the first wavelength. The at least one optical detector is configured to detect an intensity of the light beams scattered by abrasive particles in the slurry.

In some embodiments, a chemical mechanical polish (CMP) system includes at least one CMP apparatus, a first slurry supply unit, a second slurry supply unit, a first slurry supply pipe loop, a second slurry supply pipe loop and a slurry monitoring device. The first slurry supply unit and the second slurry supply unit are configured to supply a slurry to the CMP apparatus. The first slurry supply pipe loop is connected to the first slurry supply unit and the at least one CMP apparatus. The second slurry supply pipe loop is connected to the second slurry supply unit and the at least one CMP apparatus. The slurry monitoring device is connected to the first slurry supply pipe loop and the second slurry supply pipe loop, and configured to monitor a quality of the slurry.

In some embodiments, a method of in-line monitoring a slurry includes the following operations. A slurry is conducted from a first slurry supply pipe loop to a slurry metrology cell. A light beam is impinged on the slurry accommodated in the slurry metrology cell. An intensity of the light beam scattered by abrasive particles of the slurry is detected. Estimated sizes of the abrasive particles in the slurry are obtained based on the intensity of the light beam scattered by abrasive particles of the slurry.

In some embodiments, a slurry monitoring device is provided. The slurry monitoring device includes a slurry metrology cell, a plurality of light sources, at least one optical lens, and at least one optical detector. The slurry metrology cell is configured to accommodate a slurry. The light sources are configured to emit light beams on the slurry in the slurry metrology cell. The light sources include a first light source configured to emit a first light beam having a first wavelength, and a second light source configured to emit a second light beam having a second wavelength different from the first wavelength. The at least one optical lens is disposed between the plurality of light sources and the slurry metrology cell. The at least one optical lens is configured to modify a size of a light spot of the light beams impinged on the slurry. The at least one optical detector is configured to detect an intensity of the light beams scattered by abrasive particles in the slurry.

In some embodiments, a chemical mechanical polish (CMP) system is provided. The CMP system includes at least one CMP apparatus, a first slurry supply unit, a second slurry supply unit, a first slurry supply pipe loop, a second slurry supply pipe loop and a slurry monitoring device. The first slurry supply pipe loop is connected to the first slurry supply unit and the at least one CMP apparatus. The second slurry supply pipe loop is connected to the second slurry supply unit and the at least one CMP apparatus. The slurry monitoring device is connected to the first slurry supply pipe loop and the second slurry supply pipe loop. The slurry monitoring device include a slurry metrology cell, a plurality of light sources, and at least one optical lens. The slurry metrology cell is in communication with the first slurry pipe loop and the second slurry pipe loop, and configured to accommodate a slurry. The light sources are configured to emit light beams on the slurry in the slurry metrology cell. The at least one optical lens is disposed between the plurality of light sources and the slurry metrology cell. The at least one optical lens is configured to modify a size of a light spot of the light beam impinged on the slurry.

In some embodiments, a method of in-line monitoring a slurry is provided. The method includes following operations. A slurry is conducted from a first slurry supply pipe loop to a slurry metrology cell. A light beam is impinged on the slurry accommodated in the slurry metrology cell through an optical lens. An intensity of the light beam scattered by abrasive particles of the slurry is detected. Estimated sizes of the abrasive particles in the slurry are obtained based on the intensity of the light beam scattered by abrasive particles of the slurry.

The foregoing outlines structures of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A chemical mechanical polish (CMP) system comprising:

a CMP apparatus;

a slurry supply unit;

a slurry supply pipe loop connected to the slurry supply unit and the CMP apparatus;

a slurry metrology cell connected to the slurry supply pipe loop, and configured to accommodate a slurry;

a plurality of light sources configured to emit light beams on the slurry in the slurry metrology cell, wherein the plurality of light sources comprise a first light source emitting a first light beam having a first wavelength, and a second light source configured to emit a second light beam having a second wavelength different from the first wavelength;

at least one optical chopper disposed between the plurality of light sources and the slurry metrology cell, and configured to modify a pulse duration of the first and second light beams;

a plurality of optical lenses disposed between the plurality of light sources and the slurry metrology cell, wherein the plurality of optical lenses comprise a first optical lens configured to modify a size of a light spot of the first light beam impinged on the slurry and a second optical lens configured to modify a size of a light spot of the second light beam impinged on the slurry; and a first optical detector configured to detect an intensity of the first light beam scattered by abrasive particles in the slurry, and a second optical detector configured to detect an intensity of the second light beam scattered by the abrasive particles in the slurry, wherein the first optical detector is separated from the second optical detector, wherein the plurality of light sources, the at least one optical chopper and the plurality of optical lenses are arranged in a direction perpendicular to a flow direction of the slurry, wherein the first light beam has a first incident direction toward the first optical detector, the second light beam has a second incident direction toward the second optical detector, and the first incident direction and the second incident direction are perpendicular to the flow direction of the slurry.

2. CMP system of claim 1, wherein an inlet of the slurry is disposed on a first side of the slurry metrology cell, and an outlet of the slurry is disposed on a second side of the slurry metrology cell, wherein the first side is opposite to the second side.

3. The CMP system of claim 2, wherein the plurality of light sources are disposed adjacent to a third side of the slurry metrology cell, and the first optical detector and the second optical detector are disposed adjacent to a fourth side of the slurry metrology cell, and wherein the third side is opposite to the fourth side.

4. The CMP system of claim 1, wherein the first optical lens is disposed between the slurry metrology cell and the at least one optical chopper.

5. The CMP system of claim 1, a quantity of the plurality of optical lenses and a quantity of the plurality of light sources are the same.

6. The CMP system of claim 1, wherein the plurality of light sources are enclosed by a black box.

7. The CMP system of claim 1, wherein the first optical detector and the second optical detector are enclosed by a black box.

8. The CMP system of claim 1, wherein the at least one optical chopper and the plurality of optical lenses are enclosed by a black box.

9. A chemical mechanical polish (CMP) system, comprising:

at least one CMP apparatus;

a first slurry supply unit and a second slurry supply unit;

a first slurry supply pipe loop connected to the first slurry supply unit and the at least one CMP apparatus;

a second slurry supply pipe loop connected to the second slurry supply unit and the at least one CMP apparatus; and a slurry monitoring device connected to the first slurry supply pipe loop and the second slurry supply pipe loop, wherein the slurry monitoring device comprises:

a slurry metrology cell, in communication with the first slurry supply pipe loop and the second slurry supply pipe loop, and configured to accommodate a slurry;

a plurality of light sources configured to emit light beams on the slurry in the slurry metrology cell, wherein the plurality of light sources comprise a first light source emitting a first light beam and a second light source emitting a second light beam;

at least one optical lens disposed between the plurality of light sources and the slurry metrology cell, and configured to modify a size of a light spot of the light beams impinged on the slurry;

at least one optical chopper disposed between the plurality of light sources and the slurry metrology cell; and a first optical detector configured to detect an intensity of the first light beam scattered by abrasive particles in the slurry, and a second optical detector configured to detect an intensity of the second light beam scattered by the abrasive particles in the slurry, wherein the plurality of light sources, the at least one optical chopper and the at least one optical lens are arranged in a direction perpendicular to a flow direction of the slurry, wherein the first light beam has a first incident direction toward the first optical detector, the second light beam has a second incident direction toward the second optical detector, and the first incident direction and the second incident direction are perpendicular to the flow direction of the slurry.

10. The CMP system of claim 9, wherein the at least one optical chopper is configured to modify a pulse duration of the light beams.

11. The CMP system of claim 10, wherein the at least one optical lens is disposed between the slurry metrology cell and the at least one optical chopper.

12. The CMP system of claim 9, wherein the slurry metrology cell is connected to slurry return lines of the first slurry supply pipe loop and the second slurry supply pipe loop.

13. The CMP system of claim 9, further comprising a controller connected to the slurry monitoring device, and configured to control the slurry monitoring device.

14. A method of in-line monitoring a slurry, comprising:

conducting the slurry from a first slurry supply pipe loop to a slurry metrology cell;

emitting a first light beam and a second light beam toward the slurry metrology cell;

modifying a pulse duration of at least one of the first light beam and the second light beam by an optical chopper;

impinging the first light beam and the second light beam on the slurry accommodated in the slurry metrology cell through optical lenses;

detecting an intensity of the first light beam scattered by abrasive particles of the slurry by a first optical detector, and detecting an intensity of the second light beam scattered by the abrasive particles of the slurry by a second optical detector; and obtaining estimated sizes of the abrasive particles in the slurry based on the intensity of the first light beam and the intensity of the second light beam scattered by the abrasive particles of the slurry, wherein the optical chopper, the optical lenses and the first and second optical detectors are arranged in a direction perpendicular to a flow direction of the slurry, wherein the first light beam has a first incident direction toward the first optical detector, the second light beam has a second incident direction toward the second optical detector, and the first incident direction and the second incident direction are perpendicular to the flow direction of the slurry.

15. The method of claim 14, further comprising modifying a size of a light spot of the first light beam impinged on the slurry by at least one lens of the optical lenses.

16. The method of claim 14, wherein the slurry metrology cell comprises an inlet disposed on a first side of the slurry metrology cell, and an outlet disposed on a second side of the slurry metrology cell, wherein the first side is opposite to the second side.

17. The method of claim 14, wherein the pulse duration of the first light beam is modified based on a reference size of the abrasive particles of the slurry.

18. The method of claim 14, further comprising sending a notification if the estimated sizes of the abrasive particles are larger than a reference size of the abrasive particles of the slurry.

19. The method of claim 14, further comprising:

shutting a supply of the first slurry supply pipe loop if a result of the in-line monitoring of the slurry is abnormal; and switching the supply of the first slurry supply pipe loop to a second slurry supply pipe loop.

20. The method of claim 14, wherein a wavelength of the second light beam is different from a wavelength of the first light beam.

* * * * *